United States Patent
Xia et al.

(10) Patent No.: US 10,152,411 B2
(45) Date of Patent: Dec. 11, 2018

(54) CAPABILITY VALUE-BASED STORED DATA ALLOCATION METHOD AND APPARATUS, AND STORAGE SYSTEM

(71) Applicant: Huawei Technologies Co., Ltd., Shenzhen (CN)

(72) Inventors: Deyu Xia, Xi'an (CN); Huangang Hu, Chengdu (CN); Yao Zhang, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/471,076

(22) Filed: Mar. 28, 2017

(65) Prior Publication Data

US 2017/0199812 A1 Jul. 13, 2017

Related U.S. Application Data

(63) Continuation of application No. PCT/CN2015/096569, filed on Dec. 7, 2015.

(30) Foreign Application Priority Data

Dec. 12, 2014 (CN) .......................... 2014 1 0767121

(51) Int. Cl.
*G06F 3/06* (2006.01)
*G06F 12/02* (2006.01)

(52) U.S. Cl.
CPC .......... *G06F 12/0238* (2013.01); *G06F 3/061* (2013.01); *G06F 3/0631* (2013.01);
(Continued)

(58) Field of Classification Search
CPC ...... G06F 12/0238; G06F 12/02; G06F 12/00; G06F 12/023; G06F 2212/1016;
(Continued)

(56) References Cited

U.S. PATENT DOCUMENTS

| 8,370,597 B1 * | 2/2013 | Chatterjee ............. G06F 3/0604 707/651 |
| 8,433,848 B1 * | 4/2013 | Naamad ................ G06F 3/0605 711/114 |

(Continued)

FOREIGN PATENT DOCUMENTS

| CN | 102317901 A | 1/2012 |
| CN | 102341779 A | 2/2012 |

(Continued)

OTHER PUBLICATIONS

Foreign Communication From a Counterpart, PCT Application No. PCT/CN2015/096569, English Translation of International Search Report dated Mar. 4, 2016, 2 pages.

(Continued)

*Primary Examiner* — Michael Krofcheck
(74) *Attorney, Agent, or Firm* — Conley Rose, P.C.

(57) ABSTRACT

In a method for allocating data to multiple disks for storage, a capability value of each of the multiple disks is obtained. The capability value is ratio of a performance indicator value of a disk to a maximum capacity value of the disk. A greatest capability value is identified from multiple capability value. Based on the greatest capability value and a maximum capacity value of each of the multiple disks, allocation shares of the multiple disks are determined. Based on the determined allocation shares, data is allocated for the multiple disks. Through the method, the overall storage performance of a storage system is improved.

6 Claims, 3 Drawing Sheets

(52) U.S. Cl.
CPC .... *G06F 3/0689* (2013.01); *G06F 2212/1016* (2013.01); *G06F 2212/261* (2013.01)

(58) Field of Classification Search
CPC .. G06F 2212/261; G06F 3/061; G06F 3/0611; G06F 3/0613; G06F 3/0608; G06F 3/0631; G06F 3/0629; G06F 3/0646; G06F 3/0653; G06F 3/0683; G06F 3/0685; G06F 3/0688; G06F 3/0689
See application file for complete search history.

(56) References Cited

U.S. PATENT DOCUMENTS

| | | | | |
|---|---|---|---|---|
| 8,539,197 | B1 * | 9/2013 | Marshall | G06F 13/00 711/112 |
| 9,047,017 | B1 * | 6/2015 | Dolan | G06F 3/0653 |
| 9,495,112 | B1 * | 11/2016 | Braun | G06F 3/0631 |
| 2007/0050588 | A1 | 3/2007 | Tabata et al. | |
| 2010/0057976 | A1 | 3/2010 | Lasser | |
| 2012/0265961 | A1 | 10/2012 | Mine et al. | |
| 2014/0280765 | A1 | 9/2014 | Hughes et al. | |

FOREIGN PATENT DOCUMENTS

| | | |
|---|---|---|
| CN | 102369506 A | 3/2012 |
| CN | 103077197 A | 5/2013 |
| CN | 103345430 A | 10/2013 |
| CN | 103559155 A | 2/2014 |
| WO | 2010099992 A1 | 9/2010 |

OTHER PUBLICATIONS

Foreign Communication From a Counterpart, PCT Application No. PCT/CN2015/096569, English Translation of Written Opinion dated Mar. 4, 2016, 5 pages.

* cited by examiner

CAPABILITY VALUE-BASED STORED DATA ALLOCATION METHOD AND APPARATUS, AND STORAGE SYSTEM

CROSS-REFERENCE TO RELATED APPLICATIONS

This application is a continuation of International Application No. PCT/CN2015/096569, filed on Dec. 7, 2015, which claims priority to Chinese Patent Application No. 201410767121.9, filed on Dec. 12, 2014, both of which are hereby incorporated by reference in their entireties.

TECHNICAL FIELD

The present disclosure relates to the field of data storage, and in particular, to a stored data allocation method and apparatus, and a storage system.

BACKGROUND

In an environment of long-time running, for reasons such as capacity expansion and equipment replacement, disks having different performance and capacities exist in a distributed storage system including Ethernet. The performance and the capacities of the disks affect performance and a capacity of the entire system. It is of worth to research on how to fully bring the performance and the capacities of the disks into play to ensure maximization of the performance and the capacity of the distributed storage system.

In the prior art, a distributed storage system generally allocates stored data according to capacity proportions of disks. More stored data is allocated to a disk with a larger capacity. For example, for a disk with a capacity of 4 terabytes (TB) and a disk with a capacity of 2 TB in a system, more stored data is allocated to the disk of 4 TB than that allocated to the disk of 2 TB according to a capacity proportion.

However, performance of a larger-capacity disk may be the same as performance of a smaller-capacity disk. For example, input/output operations per second (IOPS) of a larger-capacity disk may be the same as IOPS of a smaller-capacity disk. Therefore, if the foregoing stored data allocation method according to capacity proportions is used, it is likely that system storage performance is severely affected because storage space of a smaller-capacity disk has been used up, but a large amount of storage space of a larger-capacity disk is still available, and therefore storage performance of each disk cannot be fully brought into play, and storage capacities cannot be fully used.

SUMMARY

Embodiments of the present disclosure provide a stored data allocation method and apparatus, and a storage system, so as to overcome a problem in the prior art that system storage performance is severely affected because storage performance of disks cannot be fully brought into play and storage capacities cannot be fully used.

According to a first aspect, an embodiment of the present disclosure provides a stored data allocation method, and the method is used to allocate to-be-stored data to at least two disks for storage, and includes determining a reference value according to storage statuses of disks and first performance-to-capacity ratios of the disks, where the first performance-to-capacity ratios of the disks are ratios of performance indicators of the disks to maximum capacities of the disks; determining second performance-to-capacity ratios of the disks according to the first performance-to-capacity ratios of the disks and the reference value; determining allocation shares of the disks according to the determined second performance-to-capacity ratios of the disks and the maximum capacities of the disks; and allocating received to-be-stored first data to the disks according to the determined allocation shares of the disks, so as to write the first data to the disks.

With reference to the first aspect, in a first possible implementation manner of the first aspect, the method further includes monitoring the storage statuses of the disks according to the first data stored in the disks; if it is monitored that a storage status of at least one of the disks is a full-write state, performing again the step of determining a reference value according to storage statuses of disks and first performance-to-capacity ratios of the disks to the step of determining allocation shares of the disks according to the determined second performance-to-capacity ratios of the disks and the maximum capacities of the disks; and reallocating the stored first data to the disks according to the re-determined allocation shares.

With reference to the first possible implementation manner of the first aspect, in a second possible implementation manner of the first aspect, the reallocating the stored first data to the disks according to the re-determined allocation shares includes comparing data stored in the disks with data obtained through reallocation; and if the data stored in the disks is more than the data obtained through reallocation, emigrating the data stored in the disks; or if the data stored in the disks is less than the data obtained through reallocation, immigrating the data stored in the disks.

With reference to the first or the second possible implementation manner of the first aspect, in a third possible implementation manner of the first aspect, after the reallocating the stored first data to the disks according to the re-determined allocation shares, the method further includes allocating received to-be-stored second data to the disks according to the re-determined allocation shares.

With reference to any one of the first aspect or the first possible implementation manner to the third possible implementation manner of the first aspect, in a fourth possible implementation manner of the first aspect, the determining a reference value according to storage statuses of disks and first performance-to-capacity ratios of the disks includes, when the storage statuses of the disks are a non-full-write state, selecting a highest first performance-to-capacity ratio of the disks as the reference value.

With reference to the fourth possible implementation manner of the first aspect, in a fifth possible implementation manner of the first aspect, the method further includes, when a storage status of at least one of the disks is a full-write state, selecting a highest first performance-to-capacity ratio of disks whose storage statuses are a non-full-write state as the reference value.

With reference to any one of the first aspect or the first possible implementation manner to the fifth possible implementation manner of the first aspect, in a sixth possible implementation manner of the first aspect, the determining second performance-to-capacity ratios of the disks according to the first performance-to-capacity ratios of the disks and the reference value includes determining whether the first performance-to-capacity ratios of the disks are greater than the reference value; and if the first performance-to-capacity ratios of the disks are greater than the reference value, determining that the reference value is the second performance-to-capacity ratios of the disks; or if the first performance-to-capacity ratios of the disks are not greater than the reference value, determining that the first performance-to-capacity ratios are the second performance-to-capacity ratios of the disks.

With reference to any one of the first aspect or the first possible implementation manner to the sixth possible implementation manner of the first aspect, in a seventh possible implementation manner of the first aspect, the performance indicators of the disks are IOPS.

According to a second aspect, an embodiment of the present disclosure provides a stored data allocation apparatus, and the apparatus is configured to allocate to-be-stored data to at least two disks for storage, and includes a first determining module configured to determine a reference value according to storage statuses of disks and first performance-to-capacity ratios of the disks, where the first performance-to-capacity ratios of the disks are ratios of performance indicators of the disks to maximum capacities of the disks; and determine second performance-to-capacity ratios of the disks according to the first performance-to-capacity ratios of the disks and the reference value; a second determining module configured to determine allocation shares of the disks according to the second performance-to-capacity ratios of the disks determined by the first determining module and the maximum capacities of the disks; and an allocation module configured to allocate received to-be-stored first data to the disks according to the allocation shares of the disks determined by the determining module, so as to write the first data to the disks.

With reference to the second aspect, in a first possible implementation manner of the second aspect, the apparatus further includes a monitoring module configured to monitor the storage statuses of the disks according to the first data stored in the disks, where if the monitoring module monitors that a storage status of at least one of the disks is a full-write state, the first determining module performs again the step of determining a reference value according to storage statuses of disks and first performance-to-capacity ratios of the disks to the step of determining second performance-to-capacity ratios of the disks according to the first performance-to-capacity ratios of the disks and the reference value, and the second determining module performs again the step of determining allocation shares of the disks according to the determined second performance-to-capacity ratios of the disks and the maximum capacities of the disks; and the allocation module is further configured to reallocate the stored first data to the disks according to the allocation shares re-determined by the second determining module.

With reference to the first possible implementation manner of the second aspect, in a second possible implementation manner of the second aspect, the allocation module is configured to compare data stored in the disks with data obtained through reallocation; and if the data stored in the disks is more than the data obtained through reallocation, emigrate the data stored in the disks; or if the data stored in the disks is less than the data obtained through reallocation, immigrate the data stored in the disks.

With reference to the first or the second possible implementation manner of the second aspect, in a third possible implementation manner of the second aspect, after reallocating the stored first data to the disks according to the re-determined allocation shares, the allocation module is further configured to allocate received to-be-stored second data to the disks according to the re-determined allocation shares.

With reference to any one of the second aspect or the first possible implementation manner to the third possible implementation manner of the second aspect, in a fourth possible implementation manner of the second aspect, the first determining module is configured to, when the storage statuses of the disks are a non-full-write state, select a highest first performance-to-capacity ratio of the disks as the reference value.

With reference to the fourth possible implementation manner of the second aspect, in a fifth possible implementation manner of the second aspect, the first determining module is further configured to, when a storage status of at least one of the disks is a full-write state, select a highest first performance-to-capacity ratio of disks whose storage statuses are a non-full-write state as the reference value.

With reference to any one of the second aspect or the first possible implementation manner to the fifth possible implementation manner of the second aspect, in a sixth possible implementation manner of the second aspect, the first determining module is configured to determine whether the first performance-to-capacity ratios of the disks are greater than the reference value; and if the first performance-to-capacity ratios of the disks are greater than the reference value, determine that the reference value is the second performance-to-capacity ratios of the disks; or if the first performance-to-capacity ratios of the disks are not greater than the reference value, determine that the first performance-to-capacity ratios are the second performance-to-capacity ratios of the disks.

With reference to any one of the second aspect or the first possible implementation manner to the sixth possible implementation manner of the second aspect, in a seventh possible implementation manner of the second aspect, the performance indicators of the disks are IOPS.

According to a third aspect, an embodiment of the present disclosure provides a storage system, including at least two disks, and the stored data allocation apparatus according to any one of the second aspect or the first possible implementation manner to the seventh possible implementation manner of the second aspect.

According to the stored data allocation method and apparatus, and the storage system provided in the embodiments of the present disclosure, by determining a reference value according to storage statuses of disks and first performance-to-capacity ratios of the disks, and determining allocation-performance-to-capacity ratios of the disks according to the reference value, allocation shares of the disks can be dynamically adjusted, so that when all capacities of the disks of the system reach bottlenecks, a larger share is allocated to a disk having higher performance, so as to fully bring storage performance of the disks into play, thereby improving storage performance of the entire system.

BRIEF DESCRIPTION OF DRAWINGS

To describe the technical solutions in the embodiments of the present disclosure or in the prior art more clearly, the following briefly describes the accompanying drawings required for describing the embodiments or the prior art. The accompanying drawings in the following description show some embodiments of the present disclosure, and persons of ordinary skill in the art may still derive other drawings from these accompanying drawings without creative efforts.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. The described embodiments are a part rather than all of the embodiments of the present disclosure. All other embodiments obtained by persons of ordinary skill in the art based on the embodiments of the present disclosure without creative efforts shall fall within the protection scope of the present disclosure.

Figure 1:
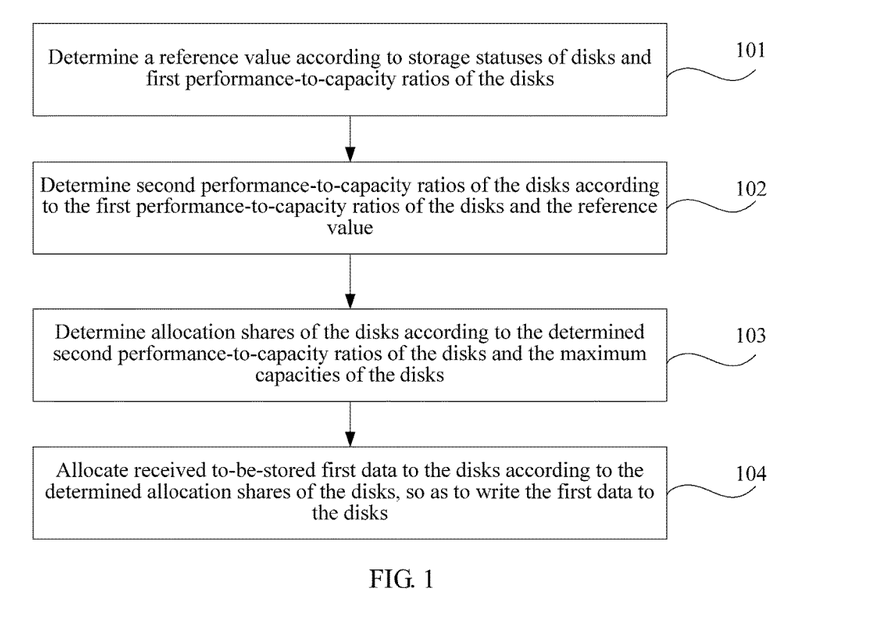
FIG. 1 is a flowchart of Embodiment 1 of a stored data allocation method according to the present disclosure.

FIG. 1 is a flowchart of Embodiment 1 of a stored data allocation method according to the present disclosure. As shown in FIG. 1, the method may be used to allocate to-be-stored data to at least two disks for storage. For a scenario in which none of storage statuses of all disks reaches a capacity bottleneck when a system is initialized, the method includes the following steps.

Step 101: Determine a reference value according to storage statuses of disks and first performance-to-capacity ratios of the disks.

The first performance-to-capacity ratios of the disks are ratios of performance indicators of the disks to maximum capacities of the disks, and the performance indicators of the disks may be but are not limited to IOPS.

In an embodiment of the present disclosure, step 101 may include, when the storage statuses of the disks are a non-full-write state, selecting a highest first performance-to-capacity ratio of the disks as the reference value.

Further, step 101 may further include, when a storage status of at least one of the disks is a full-write state, selecting a highest first performance-to-capacity ratio of disks whose storage statuses are a non-full-write state as the reference value.

Description is made using an example in which the foregoing at least two disks include a disk A, a disk B, and a disk C, where a maximum capacity $V_{(a)}$ and a performance indicator $IOPS_{(a)}$ of the disk A are respectively 2 TB and 10, a maximum capacity $V_{(b)}$ and a performance indicator $IOPS_{(b)}$ of the disk B are respectively 1 TB and 20, and a maximum capacity $V_{(c)}$ and a performance indicator $IOPS_{(c)}$ of the disk C are respectively 4 TB and 20. For a case in which another quantity of disks have different capacities and different performance indicators, the stored data allocation method provided in this embodiment of the present disclosure is also applicable, and details are not described herein.

According to the foregoing content, it can be learned that a first performance-to-capacity ratio $R_{(a)}$ of the disk A is 5 (10/2), a first performance-to-capacity ratio $R_{(b)}$ of the disk B is 20 (20/1), and a first performance-to-capacity ratio $R_{(c)}$ of the disk C is 5 (20/4). If none of storage statuses of the disk A, the disk B, and the disk C reaches a capacity bottleneck, a highest performance-to-capacity ratio in the system is selected as a reference value, that is, the first performance-to-capacity ratio $R_{(b)}$ of the disk B is selected as the reference value. If the storage status of the disk B reaches a full-write state, a first performance-to-capacity ratio that is less than the first performance-to-capacity ratio of the disk B is selected as the reference value, that is, the first performance-to-capacity ratio $R_{(a)}$ of the disk A or the first performance-to-capacity ratio $R_{(c)}$ of the disk C is selected as the reference value.

Step 102: Determine second performance-to-capacity ratios of the disks according to the first performance-to-capacity ratios of the disks and the reference value.

Further, step 102 may include determining whether the first performance-to-capacity ratios of the disks are greater than the reference value; and if the first performance-to-capacity ratios of the disks are greater than the reference value, determining that the reference value is the second performance-to-capacity ratios of the disks; or if the first performance-to-capacity ratios of the disks are not greater than the reference value, determining that the first performance-to-capacity ratios are the second performance-to-capacity ratios of the disks.

Step 103: Determine allocation shares of the disks according to the determined second performance-to-capacity ratios of the disks and the maximum capacities of the disks.

In an embodiment of the present disclosure, the foregoing determining allocation shares of the disks according to the determined second performance-to-capacity ratios and the maximum capacities of the disks may include determining allocation performance indicators of the disks according to products of the second performance-to-capacity ratios and the maximum capacities of the disks; and determining the allocation shares of the disks according to the allocation performance indicators of the disks, where the allocation shares of the disks may be determined using ratios of the allocation performance indicators of the disks to a sum of the allocation performance indicators of the disks in the system.

For example, when all the storage statuses of the disk A, the disk B, and the disk C are non-full-write, the highest first performance-to-capacity ratio of all the disks is determined as a reference value, and all the first performance-to-capacity ratios of the disks are not greater than the reference value. In this case, the second performance-to-capacity ratios of the disks are the first performance-to-capacity ratios, and allocation performance indicators of the disks are determined according to products of the second performance-to-capacity ratios of the disks and the maximum capacities of the disks, to learn that the allocation performance indicators of the disks are performance indicators of the disks. That is, allocation performance indicators of the disk A, the disk B, and the disk C are respectively 10, 20, and 20. Further, allocation shares of the disk A, the disk B, and the disk C are respectively: 10/(10+20+20), 20/(10+20+20), and 20/(10+20+20) that are respectively: 20%, 40%, and 40%.

Because the allocation share of the disk B is the largest, and the capacity of the disk B is the smallest, the disk B is first fully written. In this case, the performance-to-capacity ratio of the disk A or the disk C is reselected as a reference value. Because the first performance-to-capacity ratio of the disk B is greater than the reselected reference value, the second performance-to-capacity ratio of the disk B is 5, and the second performance-to-capacity ratio of the disk A and the second performance-to-capacity ratio of the disk C are still 5. In this case, it is learned that the allocation performance indicators of the disks are respectively 10, 5, and 20, and further, it is learned that the allocation shares of the disk A, the disk B, and the disk C are respectively: 10/(10+5+20), 5/(10+5+20), and 20/(10+5+20) that are respectively: 29%, 14%, and 57%.

Step 104: Allocate received to-be-stored first data to the disks according to the determined allocation shares of the disks, so as to write the first data to the disks.

In this embodiment, by determining a reference value according to storage statuses of disks and first performance-to-capacity ratios of the disks, and determining allocation-performance-to-capacity ratios of the disks according to the reference value, allocation shares of the disks can be dynamically adjusted, so that when all capacities of the disks of a system reach bottlenecks, a larger share is allocated to a disk having higher performance, so as to fully bring storage performance of the disks into play, thereby improving storage performance of the entire system.

Figure 2:
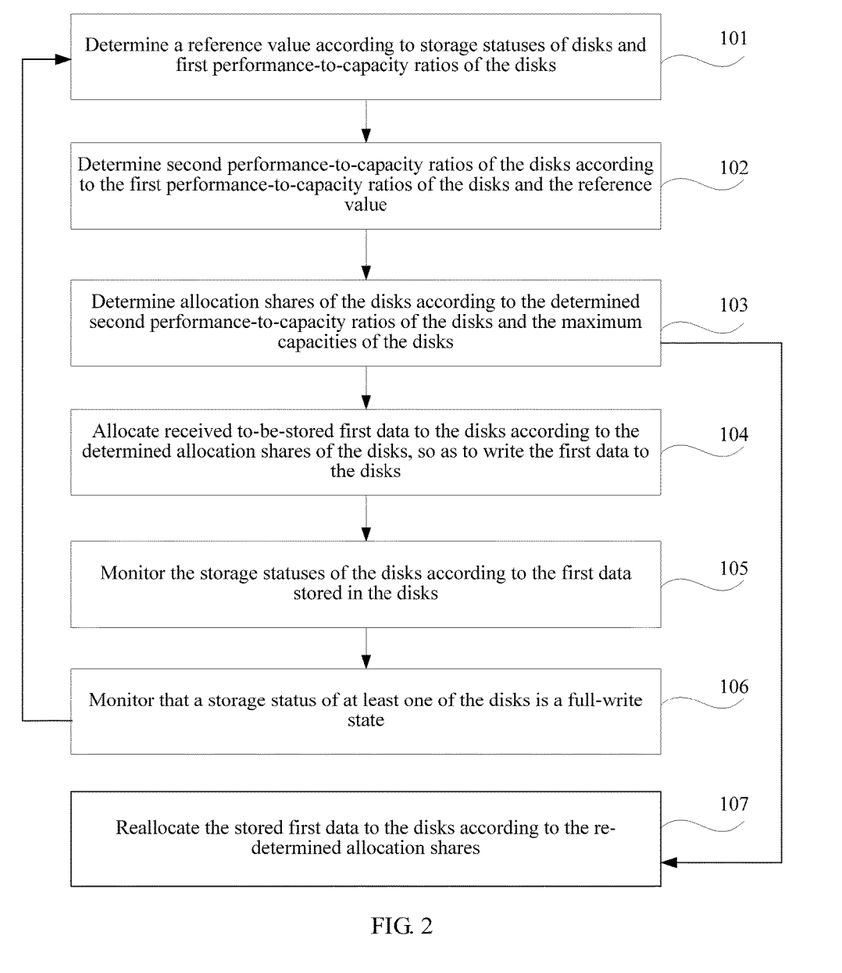
FIG. 2 is a flowchart of Embodiment 2 of a stored data allocation method according to the present disclosure.

FIG. 2 is a flowchart of Embodiment 2 of a stored data allocation method according to the present disclosure, and Embodiment 2 is an example of an embodiment of the present disclosure for a scenario in which a storage status of at least one disk in a system reaches a capacity bottleneck. As shown in FIG. 2, after step 104, the method embodiment further includes the following steps.

Step 105: Monitor the storage statuses of the disks according to the first data stored in the disks.

Step 106: If it is monitored that a storage status of at least one of the disks is a full-write state, perform again step 101 to step 103.

Step 107: Reallocate the stored first data to the disks according to the re-determined allocation shares.

The reallocating the stored first data to the disks according to the re-determined allocation shares includes comparing data stored in the disks with data obtained through reallocation; and if the data stored in the disks is more than the data obtained through reallocation, emigrating the data stored in the disks; or if the data stored in the disks is less than the data obtained through reallocation, immigrating the data stored in the disks.

For a disk whose storage status is full-write, a data difference between the stored first data and the data obtained through reallocation may be emigrated to other disks whose capacities are relatively large and whose storage statuses are non-full-write. The part that is emigrated may be immigrated to disks whose storage statuses are a non-full-write state according to that a data amount immigrated to the disks is a data difference between data obtained by the disks through reallocation and stored data.

For example, when the system is initialized, data is written to the disk A, the disk B, and the disk C according to allocation shares of 20%, 40%, and 40%. When the disk B is fully written, 1 TB of data is written to the disk B; correspondingly, 0.5 TB of data is written to the disk A, and 1 TB of data is written to the disk C. First data that is totally written is a sum of data that is written to all the disks, that is, 2.5 TB. In this case, it is re-determined that the reference value is 5, and the re-determined allocation shares of the disk A, the disk B, and the disk C are respectively 29%, 14%, and 57%. The 2.5 TB of data that is written is reallocated, and data obtained through reallocation by the disk A, the disk B, and the disk C is respectively 2.5 TB×29%, 2.5 TB×14%, and 2.5 TB×57%. According to the reallocated data, a data amount emigrated from the disk B is 1 TB-2.5 TB×14%, and data amounts immigrated to the disk A and the disk C are respectively 2.5 TB×29%-0.5 TB and 2.5 TB×57%-1 TB. In this way, stored data is reallocated in each disk, and after the reallocation, data can continue to be written to disks having high performance and low capacities.

Further, after the reallocating the stored first data to the disks according to the re-determined allocation shares, the method further includes allocating received to-be-stored second data to the disks according to the re-determined allocation shares.

It should be understood that, according to the method embodiment provided in the present disclosure, after the received to-be-stored second data is allocated to the disks, the steps of the method embodiment shown in FIG. 2 are repeatedly performed until all the disks in the system reach a full-write state, thereby fully using capacities of the disks in the system.

It should be understood that, when the disks in the system continuously receive to-be-stored data, the received to-be-stored data is continuously written to the disks according to allocation shares. The second data and the first data are data that is continuously written. When it is monitored that at least one disk is fully written, after stored data in the disks is reallocated, the second data continues to be written to the disks after data can be written to the disks.

In this embodiment, on the basis of the method embodiment shown in FIG. 1, further, by re-determining the reference value, the allocation shares of the disks are re-determined according to the re-determined reference value; data that has been written to the disks is reallocated according to the re-determined allocation shares of the disks, that is, data is emigrated from disks that have high performance and low capacities and have been fully written, and the data that is emigrated is immigrated to disks having relatively large capacities, so that data can be continuously written to the disks having high performance and low capacities, thereby improving storage performance of the entire system. In addition, by continuously monitoring storage statuses of the disks and reallocating the stored data, the storage performance of the entire system is improved, and storage space of the disks is fully used, thereby reaching a balance between performance and a capacity of the system.

It should be noted that, the stored data allocation method provided in this embodiment of the present disclosure may be also applied to a distributed computing system. Quantities of tasks to be allocated to servers may be determined according to different quantities of CPUs of the servers and different frequencies of the CPUs, thereby making full use of computing capabilities of all the servers.

Figure 3:
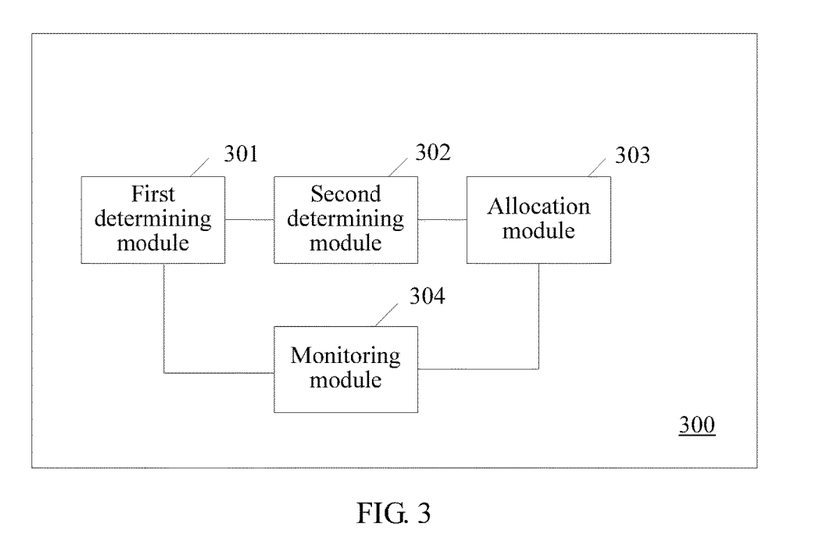
FIG. 3 is a schematic structural diagram of an embodiment of a stored data allocation apparatus according to the present disclosure.

FIG. 3 is a schematic structural diagram of an embodiment of a stored data allocation apparatus according to the present disclosure. As shown in FIG. 3, the stored data allocation apparatus 300 is configured to allocate to-be-stored data to at least two disks for storage, and includes a first determining module 301, a second determining module 302, and an allocation module 303.

The first determining module 301 is configured to determine a reference value according to storage statuses of disks and first performance-to-capacity ratios of the disks, where the first performance-to-capacity ratios of the disks are ratios of performance indicators of the disks to maximum capacities of the disks; and determine second performance-to-capacity ratios of the disks according to the first performance-to-capacity ratios of the disks and the reference value.

The performance indicators of the disks may be but are not limited to IOPS.

The second determining module 302 is configured to determine allocation shares of the disks according to the second performance-to-capacity ratios of the disks determined by the first determining module 301 and the maximum capacities of the disks; and the allocation module 303 is configured to allocate, according to the allocation shares of the disks determined by the determining module, received to-be-stored first data to the disks, so as to write the first data to the disks.

Further, the first determining module 301 is configured to, when the storage statuses of the disks are a non-full-write state, select a highest first performance-to-capacity ratio of the disks as the reference value.

The first determining module 301 is further configured to, when a storage status of at least one of the disks is a full-write state, select a highest first performance-to-capacity ratio of disks whose storage statuses are a non-full-write state as the reference value.

Further, the first determining module 301 is further configured to determine whether the first performance-to-capacity ratios of the disks are greater than the reference value; and if the first performance-to-capacity ratios of the disks are greater than the reference value, determine that the reference value is the second performance-to-capacity ratios of the disks; or if the first performance-to-capacity ratios of the disks are not greater than the reference value, determine that the first performance-to-capacity ratios are the second performance-to-capacity ratios of the disks.

Further, the stored data allocation apparatus 300 further includes a monitoring module 304 configured to monitor the storage statuses of the disks according to the first data stored in the disks, where if the monitoring module 304 monitors that a storage status of at least one of the disks is a full-write state, the first determining module 301 performs again the step of determining a reference value according to storage statuses of disks and first performance-to-capacity ratios of the disks to the step of determining second performance-to-capacity ratios of the disks according to the first performance-to-capacity ratios of the disks and the reference value, and the second determining module 302 performs again the step of determining allocation shares of the disks according to the determined second performance-to-capacity ratios of the disks and the maximum capacities of the disks; and the allocation module 303 is further configured to reallocate the stored first data to the disks according to the allocation shares re-determined by the second determining module 302.

Further, the allocation module 303 is configured to compare data stored in the disks with data obtained through reallocation; and if the data stored in the disks is more than the data obtained through reallocation, emigrate the data stored in the disks; or if the data stored in the disks is less than the data obtained through reallocation, immigrate the data stored in the disks.

Further, after reallocating the stored first data to the disks according to the re-determined allocation shares, the allocation module 303 is further configured to allocate received to-be-stored second data to the disks according to the re-determined allocation shares.

The stored data allocation apparatus provided in this embodiment may be configured to execute the technical solution in the method embodiment shown in FIG. 1 or FIG. 2, implementation principles and technical effects are similar, and details are not described herein.

Figure 4:
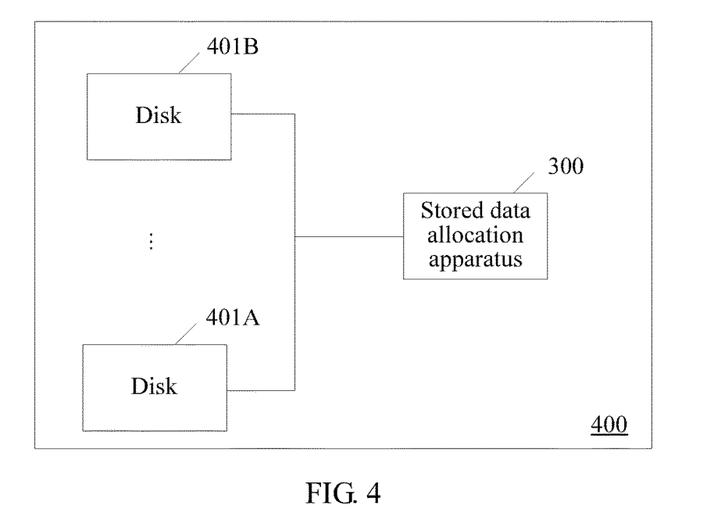
FIG. 4 is a schematic structural diagram of an embodiment of a storage system according to the present disclosure.

An embodiment of the present disclosure further provides a storage system. FIG. 4 is a schematic structural diagram of an embodiment of the storage system according to the present disclosure. As shown in FIG. 4, the storage system 400 includes at least two disks, that is, a disk 401A and a disk 401B, and the stored data allocation apparatus 300 shown in FIG. 3, and may be configured to execute the technical solutions of the method embodiments shown in FIG. 1 and FIG. 2. Implementation principles and technical effects are similar, and details are not described herein.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes any medium that can storage program code, such as a read-only memory (ROM), a random access memory (RAM), a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A method for allocating data to multiple disks for storage, comprising:
    obtaining a capability value of each of the multiple disks, wherein the capability value is a ratio of a performance indicator value of a disk to a maximum capacity value of the disk;
    identifying a greatest capability value from multiple capability values;
    obtaining each of multiple allocation performance indicators of the multiple disks which equals the maximum capacity value of each of the multiple disks multiplied by the greatest capability value from the multiple capability values;
    obtaining a total allocation performance indicator based on each of the multiple allocation performance indicators;
    determining allocation shares of the multiple disks based on each of the multiple allocation performance indicators and the total allocation performance indicator;
    allocating data for the multiple disks based on the determined allocation shares.

2. The method according to claim 1, wherein the performance indicator value of a disk includes an Input/Output Operations per Second (IOPS) value of the disk.

3. The method according to claim 1, further comprising:
    monitoring storage statuses of the disks according to first data stored in the disks;
    performing the obtaining the capability value of each of the multiple disks, the obtaining the total allocation performance indicator, and the determining allocation shares of the multiple disks when the storage status of at least one of the disks is a full-write state in order to obtain current allocation shares of the multiple disks; and
    reallocating the stored first data to the disks according to the current allocation shares of the multiple disks.

4. A storage device, comprising:
    multiple disks are configured to store data; and
    a processor coupled to the multiple disks and configured to:
        obtain a capability value of each of the multiple disks, wherein the capability value is a ratio of a performance indicator value of a disk to a maximum capacity value of the disk;
        identify a greatest capability value from multiple capability values;
        obtain each of multiple allocation performance indicators of the multiple disks which equals the maximum capacity value of each of the multiple disks multiplied by the greatest capability value from the multiple capability values;

obtain a total allocation performance indicator based on each of the multiple allocation performance indicators; and determine the allocation shares of the multiple disks based on each of the multiple allocation performance indicators and the total allocation performance indicator; and allocate data for the multiple disks based on the determined allocation shares.

5. The storage device according to claim 4, wherein the performance indicator value of a disk includes an Input/Output Operations per Second (IOPS) value of the disk.

6. The storage device according to claim 4, wherein the processor is further configured to:

monitor storage statuses of the disks according to first data stored in the disks;

performing the obtaining the capability value of each of the multiple disks, the obtaining the total allocation performance indicator, and the determining allocation shares of the multiple disks when the storage status of at least one of the disks is a full-write state in order to obtain current allocation shares of the multiple disks; and reallocate the stored first data to the disks according to the current allocation shares of the multiple disks.

* * * * *